US012255755B2

(12) United States Patent
Schonlau et al.

(10) Patent No.: US 12,255,755 B2
(45) Date of Patent: Mar. 18, 2025

(54) ETHERNET DEVICE WITH SAFETY FEATURES AT THE PHYSICAL LAYER AND METHOD FOR A BI-DIRECTIONAL DATA TRANSFER BETWEEN TWO ETHERNET DEVICES

(71) Applicant: SILICONALLY GMBH, Dresden (DE)

(72) Inventors: Benedikt Schonlau, Chemnitz (DE);
Felix Neumärker, Dresden (DE);
Sebastian Höppner, Dresden (DE);
Markus Winter, Dresden (DE);
Stephan Hartmann, Coswig (DE)

(73) Assignee: SILICONALLY GMBH, Dresden (DE)

( * ) Notice: Subject to any disclaimer, the term of this patent is extended or adjusted under 35 U.S.C. 154(b) by 0 days.

(21) Appl. No.: 18/549,714

(22) PCT Filed: Sep. 16, 2022

(86) PCT No.: PCT/EP2022/075745
§ 371 (c)(1),
(2) Date: Sep. 8, 2023

(87) PCT Pub. No.: WO2024/056184
PCT Pub. Date: Mar. 21, 2024

(65) Prior Publication Data
US 2024/0333552 A1    Oct. 3, 2024

(51) Int. Cl.
*H04L 12/40*     (2006.01)
*H04L 49/55*     (2022.01)

(52) U.S. Cl.
CPC ...... *H04L 12/40176* (2013.01); *H04L 49/555* (2013.01)

(58) Field of Classification Search
CPC .................. H04L 12/40176; H04L 49/555
See application file for complete search history.

(56) References Cited

U.S. PATENT DOCUMENTS

| | | | | |
|---|---|---|---|---|
| 5,982,595 A | * | 11/1999 | Pozzuoli | .......... H02H 3/05 |
| | | | | 361/64 |
| 6,226,771 B1 | | 5/2001 | Hilla et al. | |
| | | | (Continued) | |

FOREIGN PATENT DOCUMENTS

| | | |
|---|---|---|
| EP | 2460319 B1 | 3/2021 |
| EP | 3407546 B1 | 6/2021 |
| SE | 2051061 A1 | 4/2022 |

OTHER PUBLICATIONS

International Search Report and Written Opinion issued in PCT/EP2022/075745 mailed Mar. 28, 2023.
(Continued)

*Primary Examiner* — Luat Phung
(74) *Attorney, Agent, or Firm* — Nicholas Mesiti; HESLIN ROTHENBERG FARLEY & MESITI P.C.

(57) ABSTRACT

An ethernet device with safety features at the physical layer and a method for a bi-directional data transfer between two ethernet devices, includes at least one of two ethernet devices with safety features at the physical layer. The ethernet device can switch safety critical traffic from a first ethernet channel to a second ethernet channel if a safety problem has been detected for the first ethernet channel.

21 Claims, 3 Drawing Sheets

(56) References Cited

U.S. PATENT DOCUMENTS

| | | | |
|---|---|---|---|
| 7,127,669 B2 | 10/2006 | Platenberg et al. | |
| 8,195,989 B1 | 6/2012 | Lu et al. | |
| 10,630,494 B2* | 4/2020 | LaBosco | H04L 12/40045 |
| 2011/0170405 A1 | 7/2011 | Beecroft et al. | |
| 2015/0271085 A1* | 9/2015 | Nakajima | H04L 45/14 |
| | | | 370/465 |
| 2019/0190727 A1* | 6/2019 | LaBosco | G06F 1/28 |
| 2020/0177442 A1* | 6/2020 | Zhang | H04J 3/14 |
| 2021/0399831 A1* | 12/2021 | Lu | H03M 13/2792 |

OTHER PUBLICATIONS

Kasper Revsbech et al., "Worst-Case Traversal Time Modelling of Ethernet Based In-Car Networks Using Real Time Calculus", Aug. 22, 2011, SAT 2015 18th International Conference, Austin, TX, USA, Sep. 24-27, 2015; [Lecture Notes in Computer Science; Lect.Notes Computer], Springer, Berlin, Heidelberg, pp. 219-230.

* cited by examiner

Fig. 3

ETHERNET DEVICE WITH SAFETY FEATURES AT THE PHYSICAL LAYER AND METHOD FOR A BI-DIRECTIONAL DATA TRANSFER BETWEEN TWO ETHERNET DEVICES

CROSS REFERENCE TO RELATED APPLICATIONS

This application is a continuation of International Application No PCT/EP2022/075745, filed Sep. 16, 2022. The contents of this prior application is hereby incorporated by reference herein in its entirety.

The invention relates to an ethernet device with safety features at the physical layer. The invention further relates to a method for a bi-directional data transfer between two ethernet devices, wherein at least one of the two ethernet devices is an ethernet device with safety features at the physical layer according to the invention.

The invention relates to the technical field of automotive ethernet connectivity, as for example defined in IEEE Std. 802.3TM-2018-IEEE Standard for Ethernet. Particularly, the invention relates to reliable communication links for safety critical applications in cars. In such applications failure modes of data transmission must be prevented, which are for example loss of communication peer, message corruption, message unacceptable delay, message loss, unintended message repetition, incorrect sequencing of messages, message insertion, message masquerading, message incorrect addressing or similar failures (see for example ISO 26262-5:2018€ Annex D.1).

BACKGROUND

Faults shall be detected within a low fault detection time interval (FDTI) and be handled within a short fault handling time interval (FHTI), which brings the system to a safe state. The safe state is ideally safe operational, in the sense that data communication of safety critical communication links is still possible in case of a failure. This is important for applications like drive-by-wire or brake-by-wire.

From the prior art it is known to provide end-to-end protection of ethernet data transfers on the OSI (Open Systems Interconnection model) application layer. For example, AUTOSAR E2E Protocol Specification discloses to end-to-end data protection for sending data from one node to another node by attaching a checksum generated by the application layer to the payload data, before sending the payload data. The receiving application receives the payload data including the checksum and checks the data integrity before using the data by calculating the checksum for the received payload data and comparing this calculated checksum with the received checksum attached to payload data. This approach has the advantage, that the full communication chain of data between two applications is covered. For example, if a data package gets corrupted within an ECU (Electronic Control Unit) or even inside one processor due to a lack of failure mechanisms (e.g. ECC (Error Correcting Code) memory), the application can check the integrity of each data package. This approach has the disadvantage that the application can only detect an integrity issue, but not the reason for the integrity issue. Furthermore, integrity issues can only be detected if the receiving nodes receives any data and the sender cannot find out anything at all. Safety mechanisms for event-based messages are not possible at all, because an application has no prediction, when to receive a message.

Additionally, random failures can occur. The application cannot switch to a degradation mode after one or two corrupted packages because it could be a random failure. For CAN-based (Controller Area Network) communication it is common to accept up to 10 corrupted packages before going into any degradation mode. For a message, that is received cyclically in 50 ms cycle time, a degradation mode can earliest be started after 500 ms, which can be problematic for safety critical communication links.

From the prior art it is also known to provide data protection of ethernet data transfers on the OSI transport layer. In this case it must be distinguished between connected and connectionless transport protocols because of their different data integrity capabilities.

Connected transport protocols (like TCP) are usually not used for safety related communication, even they offer some interesting reliability features like message acknowledge and message resend. For real-time protocols transport protocols have some disadvantages that also lead to nondeterministic reliability. Establishing connections is a complex process with many states. The state-machines for the connection handling have to be fully defined and free of dead or life locks on both sides. Message acknowledges and message resends can lead to undefined bus load scenarios up to full bus congestion. Critical messages always need an open connection. Either the connection has to be always open, which creates unnecessary overhead and traffic, or has to be established before sending the message, which is highly risky. Furthermore, connected transport protocols usually only support point to point connections. Unicast or broadcast scenarios have a very high protocol complexity and implementations are not commonly used.

Connectionless transport protocols (like UDP) are not so feature rich for data reliability features, but much easier to handle and also support multi-cast and broad-cast, which is quite interesting for state of the art applications that e.g. use brokerless publish subscribe architectures (e.g. OMG DDS). The main reliability feature connectionless transport protocols can implement is another data checksum on top of the OSI data link layer.

From the prior art it is further known to provide data protection of ethernet data transfers on the OSI data-link layer. The main function of a data link layer is, to form a data package from a symbol stream and check its integrity. Therefore, data packages are typically extended by a CRC (Cyclic Redundancy Check) on the sender side and the data integrity is checked by the CRC on the receiver side. The CRC can be used as strong feature for data integrity. However, check can only be done if data is received on the received side. If the sender needs to know about a malfunctioning receiver side, e.g. for data re-routing, the data-link-layer does not support this.

EP 2 460 319 B1 presents a solution for safety critical ethernet data transmission by using two redundant physical layers. The check of the channel health condition is done by loopback tests, where multiple levels of loopbacks are proposed on MAC (Media Access Control) and physical layer level. This has the drawback that additional loopback data has to be send and the link is not operational during the loopback testing.

SE2051061A1 discloses a redundant ethernet data link where channels are switched using a relay circuit directly at the MDI (Media Dependent Interface) of the transceiver to provide a bypath path over an ethernet physical layer.

According to EP 3 407 546 B1 errors within ethernet Frames on the physical layer level can be detected by checking the CRC checksum that is generated by the MAC within the physical layer. However, EP 3 407 546 B1 does not define what "one specified or specifiable action" is to be executed in case a CRC check fails. Another method for checking CRCs within ethernet frames has been disclosed in U.S. Pat. No. 6,226,771B1.

U.S. Pat. No. 8,195,989B1 proposes to detect failures of ethernet communication channels by generation and sending of a periodic test signal over the link. This has the drawback that during test signal transmission no payload signal can be send over the link and the fault detect time interval is limited to the period of the test signal transmission. U.S. Pat. No. 8,195,989B1 only reports the indication of a link failure and not the reaction to it.

U.S. Pat. No. 7,127,669B2 discloses a redundant data link for data packet transmission where data packets are transmitted over several routes from a first transceiver to a second transceiver and are compared at the second transceiver. This mechanism does not work without payload data streams.

It is an object of the present invention to ensure reliable transmission of safety critical ethernet packets between two ethernet devices. Re-routing of safety critical ethernet packets between the two ethernet devices over a redundant link must be provided and the solution must be compliant with ethernet devices from the prior art.

SUMMARY OF THE INVENTION

The object is solved by an ethernet device with safety features at the physical layer, comprising:
- a first ethernet physical layer access device comprising:
    - a first PCS/PMA unit for accessing a first ethernet channel;
    - a first media independent interface port for ethernet data communication;
    - a second media independent interface port for ethernet data communication; and
    - a first media independent interface switch, which in a first operating state connects the first media independent interface port to the PCS/PMA unit and in a second operating state connects the first media independent interface port to the second media interface port;
- a second ethernet physical layer access device comprising:
    - a second PCS/PMA unit for accessing a second ethernet channel;
    - a third media independent interface port for ethernet data communication;
    - a fourth media independent interface port for ethernet communication;
    - a second media independent interface switch, which in a first operating state connects the second PCS/PMA unit to the third media independent interface port and in a second operating state connects the second PCS/PMA unit to the fourth media independent interface port;
- wherein the second media independent interface port of the first ethernet physical layer access device is connected to the fourth media independent interface port of the second ethernet physical layer access device;
- wherein the first ethernet physical layer access device further comprises a first physical layer safety mechanism unit for detecting a safety problem of the physical layer of the first ethernet channel, like a loss of the link, a degradation of link quality or errors in the received ethernet data packets;
- wherein the first physical layer safety mechanism unit is connected to the first media independent interface switch and to the second media independent interface switch for, preferably simultaneously, switching the first media independent interface switch and the second media independent interface switch from the first operating states to the second operating states if a problem has been detected by the first physical layer safety mechanism unit.

The ethernet device according to the invention comprises a first ethernet physical layer access device and a second ethernet physical layer access device. The first ethernet physical layer access device comprises a first PCS/PMA (Physical Coding Sublayer/Physical Medium Attachment) unit for accessing a first ethernet channel and the second ethernet physical layer access device comprises a second PCS/PMA unit for accessing a second ethernet channel. Thus, using the ethernet device according to the invention data can be transmitted over a first ethernet channel and over a second ethernet channel.

The first ethernet physical layer access device comprises a first media independent interface port for ethernet data communication, a second media independent interface port for ethernet communication and a first media independent interface switch, which in a first operating state connects the first media independent interface port to the PCS/PMA unit of the first ethernet physical layer access device and in a second operating state connects the first media independent interface port to the second media interface port.

The second ethernet physical layer access device comprises a third media independent interface port for ethernet data communication, a fourth media independent interface port for ethernet communication and a second media independent interface switch, which in a first operating state connects the second PCS/PMA unit of the second ethernet physical layer access device to the third media independent interface port and in a second operating state connects the second PCS/PMA unit of the second ethernet physical layer access device to the fourth media independent interface port.

Thus, in the first operating state first ethernet data can be communicated over the first media independent interface port, the first media independent interface switch and the first PCS/PMA unit via the first ethernet channel. Simultaneously and independently of the first ethernet data, in the first operating state second ethernet data can be communicated over the third media independent interface port, the second media independent interface switch and the second PCS/PMA unit via the second ethernet channel. Thus, first ethernet data and second ethernet data are independent of each other and transmitted in parallel over two separate ethernet channels.

According to the invention the first ethernet physical layer access device further comprises a first physical layer safety mechanism unit for detecting a safety problem of the physical layer of the first ethernet channel, like a loss of the link, a degradation of link quality or errors in the received ethernet data packets. The first physical layer safety mechanism unit is connected to the first media independent interface switch and to the second media independent interface switch for switching the first media independent interface switch and the second media independent interface switch from the first operating states to the second operating states if a problem has been detected by the first physical layer safety mechanism unit.

In this second operating state, the first media independent interface port is connected to the second media interface port and the second PCS/PMA unit to the fourth media independent interface port. Since the second media independent interface port of the first ethernet physical layer access device is connected to the fourth media independent interface port of the second ethernet physical layer access device, in the second operating state, the first ethernet data previously being transmitted over the first media independent interface port, the first media independent interface switch and the first PCS/PMA unit via the first ethernet channel is in the second operating transmitted over the first media independent interface port, the first media independent interface switch, the second media independent interface port, the fourth media independent interface port, the second media independent interface switch and the second PCS/PMA unit via the second ethernet channel. The second ethernet data transmission is stopped in the second operating state.

Thus, if the first physical layer safety mechanism unit detects a safety problem of the physical layer of the first ethernet channel, the traffic previously being transmitted via the first ethernet channel, is re-routed via the second ethernet channel, while the second ethernet data transmission transmitted in the first operating state via the second ethernet channel, is stopped in the second operating state.

The ethernet device according to the invention can detect safety problems of the physical layer of the first ethernet channel and re-route the safety critical ethernet data over the second ethernet channel. If the other ethernet device connected to the first ethernet channel and second ethernet channel is an ethernet device with safety features at the physical layer according to the present invention, it can also detect the safety problem and re-route the safety critical ethernet data over the second ethernet channel. If the other ethernet device connected to the first ethernet channel and second ethernet channel is an ethernet device without safety features at the physical layer, the re-routing of the safety critical ethernet data can be detected at the application layer and the safety critical data can be re-assembled at the application layer without the need to change the underlying ethernet device.

Pursuant to a variant of the invention, the second ethernet physical layer access device further comprises a second physical layer safety mechanism unit for detecting a safety problem of the physical layer of the second ethernet channel, like a loss of the link, a degradation of link quality or errors in the received ethernet data packets. Thus, the ethernet device can detect that the second ethernet channel has a safety problem and therefore is no longer an available back-up link for the first ethernet channel. This information can be for example forwarded to a device or application using the ethernet device according to the invention, so that this device or application is aware that a further safety problem of the first ethernet channel results in a loss of communication because there is no back-up ethernet channel available.

In a variant of the invention, the ethernet device with safety features at the physical layer further comprises a safety controller, wherein the first physical layer safety mechanism unit and/or the second physical layer safety mechanism unit send notifications to the safety controller if safety problems have been detected on the corresponding first ethernet channel and/or second ethernet channel. The safety controller can issue warnings to the system using the ethernet device that the first ethernet channel and/or second ethernet channel has safety problems. Thus, the safety controller supervises the availability of the first ethernet channel and second ethernet channel and can provide corresponding information to systems and/or applications using the ethernet device with safety features at the physical layer.

According to a variant of the invention, the ethernet device with safety features at the physical layer further comprises a first medium access controller (MAC), which connected to the first media independent interface port of the first ethernet physical layer access device, and a second medium access controller (MAC), which is connected to the third media independent interface port of the second ethernet physical layer access device. Such MACs are commonly known from the prior art and provide a connection from higher OSI layers to the OSI physical layer.

Pursuant to an advantageous variant of the invention, the first physical layer safety mechanism unit and/or the second physical layer safety mechanism unit comprise an input interface for receiving external safety signals. The external safety signal preferably relates to safety problems that can be not directly detected by the first physical layer safety mechanism unit and/or the second physical layer safety mechanism unit, but which can affect the safety of the first ethernet channel and/or second ethernet channel.

In a variant of the invention, the external safety signal originates from the hardware using the ethernet device with safety features at the physical layer. Particularly, the external safety signal refers to supply voltage range violations, temperature range violations, hardware or software built-in self-test results that indicate a component failure during operation, or similar safety critical issues of the external components. The voltage range violation is for example detected by a voltage sensor and the temperature range violation by a temperature sensor.

According to a preferred variant of the invention, the first physical layer safety mechanism unit and/or the second physical layer safety mechanism unit detect the loss of the respective link, the degradation of the respective link quality or errors in the received ethernet data packets through link status monitoring through:
  evaluation and/or checking of link idle symbols, through
    CRC checksum calculation of the received ethernet
    frames in the physical layer,
  error correction codes like RS encoder/decoder for
    1000BASE-T1,
  observation of link quality indicators, like SQI or MSI,
    and messaging of degradation of link quality,
  echo canceller weight observation to detect cable degradation during operation,
  extension of cable diagnostics during operation, and/or
  classification of faults.

For example, the observation of the link idle symbols allows to detect a safety problem even if no payload data is transmitted via the respective ethernet channel.

Pursuant to an advantageous variant of the invention, the first PCS/PMA unit for accessing the first ethernet channel and/or the second PCS/PMA unit for accessing the second ethernet channel send a predetermined pattern on the respective ethernet channel if the first physical layer safety mechanism unit respectively the second physical layer safety mechanism unit detects a safety problem for the respective ethernet channel. This predetermined pattern can be identified by other ethernet devices using the first ethernet channel and/or second ethernet channel and thereby detect that that there is a safety problem with the respective first ethernet channel and/or second ethernet channel. If the other ethernet device is an ethernet device with safety features at the physical layer according to the invention, it can directly switch from the first operating state to the second operating state if it detects the predetermined pattern on the first ethernet channel. If it detects the pattern on the second ethernet channel, it can inform the device and/or application using the ethernet device about the safety problem of the backup ethernet channel. This allows to detect faults in communication channels within a short time interval.

In a variant of the invention, in the first operating state of the first media independent interface switch and of the second media independent interface switch, the first ethernet channel is used for safety critical data traffic and the second ethernet channel is used for non-safety critical data traffic. In the second operating state of the first media independent interface switch and of the second media independent interface switch the non-safety critical data traffic over the second ethernet channel is interrupted and replaced by the safety critical data traffic of the corrupted first ethernet channel. Thus, the first ethernet channel is used for the safety critical data traffic and the second ethernet channel is used as a backup for the first ethernet channel and used for non-safety critical ethernet traffic, as long as the first ethernet channel has no security problems. Particularly, in the second operating State the non-safety critical data traffic over the second ethernet channel is immediately interrupted and replaced after a certain threshold by the safety critical data traffic. Thereby, the other ethernet device of the second ethernet channel can detect the interruption of the second ethernet channel and is not expecting further data communication. Furthermore, a clear changeover from the non-safety critical data traffic to the safety critical data traffic is guaranteed.

According to a preferred variant of the invention, the ethernet device retransmits data traffic that has not been completely transmitted before the first media independent interface switch and the second media independent interface switch have switched from the first operating state to the second operating state. Thereby, it is guaranteed that all ethernet data traffic, particularly the safety critical ethernet data traffic, is transmitted and no loss of data occurs because corrupted ethernet frames due to the safety problems of the ethernet channel are retransmitted. The retransmission can be initiated by the ethernet device with safety features at the physical layer according to the invention or by an OSI application layer.

The object is further solved by a method for a bi-directional data transfer between two ethernet devices, wherein at least one of the two ethernet devices is an ethernet device with safety features at the physical layer according to the invention, comprising the steps of:
providing a first ethernet channel between the two ethernet devices for a bi-directional safety critical data transfer;
providing a second ethernet channel between the two ethernet devices for a bi-directional non-safety critical data transfer;
using the ethernet device with safety features at the physical layer for detecting a safety problem of the physical layer of the first ethernet channel, like a loss of the link, a degradation of link quality or errors in the received ethernet data packets;
if a safety problem of the first ethernet channel has been detected, the ethernet device with safety features at the physical layer switches from a first operating state to a second operating state to:
interrupt the bi-directional non-safety critical data transfer over the second ethernet channel;
re-route the bi-directional safety critical data traffic over the second ethernet channel.

According to this method safety critical data traffic is transmitted bi-directionally via the first ethernet channel, while at the same time non-safety critical data traffic is transmitted via the second ethernet channel. If a safety problem of the first ethernet channel is detected by the ethernet device with safety features at the physical layer, like a loss of the link, a degradation of link quality or errors in the received ethernet data packets, the non-safety critical data traffic via the second ethernet channel is interrupted and the safety critical data transfer is re-routed from the first ethernet channel to the second ethernet channel. Thus, the second ethernet channel is a backup for the first ethernet channel, in case safety problems of the first ethernet channel can be compensated by the second ethernet channel. While the first ethernet channel is operating properly without safety problems, the second ethernet channel can be used for non-safety critical data traffic.

Pursuant to a variant of the invention the method comprises the step of reassembling the safety critical data after re-routing over the second ethernet channel at the physical layer or application of the other ethernet device. Thus, the safety critical data is transferred completely without any loss of information. The safety critical data can be reassembled at the physical layer if both ethernet devices of the safety critical data transfer provide safety features at the physical layer according to the invention. In this case, both ethernet devices can detect the safety problem and automatically reroute the traffic via the second ethernet channel. If only one of the ethernet devices provides safety features at the physical layer, the safety critical data must reassembled at the application layer for the ethernet device without safety features at the physical layer because this ethernet device cannot detect the safety problem and the rerouting via the second ethernet channel. However, the application can detect this rerouting by inspection of the transferred data and reassemble the safety critical data accordingly.

In a variant of the invention the method further comprises the step of sending a predetermined pattern on the respective ethernet channel for which a safety problem has been detected. This predetermined pattern can be used by another ethernet device of the first ethernet channel or second ethernet channel to detect the safety problem and initiated for example rerouting or other measures.

According to a variant of the invention the method comprises the step of sending a notification to the system using the ethernet device if a safety problem on one of the two ethernet channels has been detected, particularly if a safety problem has been detected on both ethernet channels. The system using the ethernet device for safety critical data transfer is thereby informed that either the first ethernet channel for the safety critical data transfer has a safety problem and the safety critical data transfer has been rerouted to the second ethernet channel or that the second ethernet channel has a safety problem and is not available as a backup ethernet channel. In both cases, the reliability of the safety critical data transfer is under threat. If the first ethernet channel and the second ethernet channel have a safety problem, a severe warning should be issued to the system using the ethernet device because there is no reliable channel for the safety critical data transfer and the system can take necessary actions, like for example de-activating certain features like autonomous driving.

Pursuant to a variant of the invention the method comprises the step of receiving an external safety signal regarding the first ethernet channel and/or the second ethernet channel. Preferably, the external safety signal refers to supply voltage range violations, temperature range violations, hardware or software built-in self-test results that indicate a component failure during operation, or similar safety critical issues of the external components. Thus, not only safety problems of the physical layer are considered by the method, but also external factors which potentially degrade the safety of the ethernet channels are considered. This enhances the overall reliability and security of the inventive method.

In a variant of the invention the non-safety critical data transfer on the second ethernet channel is immediately interrupted in the second operating state and replaced after a certain threshold by the safety critical data traffic. Thereby, the other ethernet device of the second ethernet channel can detect the interruption of the second ethernet channel and is not expecting further data communication. Furthermore, a clear changeover from the non-safety critical data traffic to the safety critical data traffic is guaranteed.

According to a preferred variant of the invention the method further comprises the step of retransmitting data traffic that has not been transmitted before the switch from the first operating state to the second operating state.

BRIEF DESCRIPTION OF THE DRAWING FIGURES

In the following, the invention will be further explained with respect to the embodiments shown in the figures. It shows.

DETAILED DESCRIPTION

Figure 1:
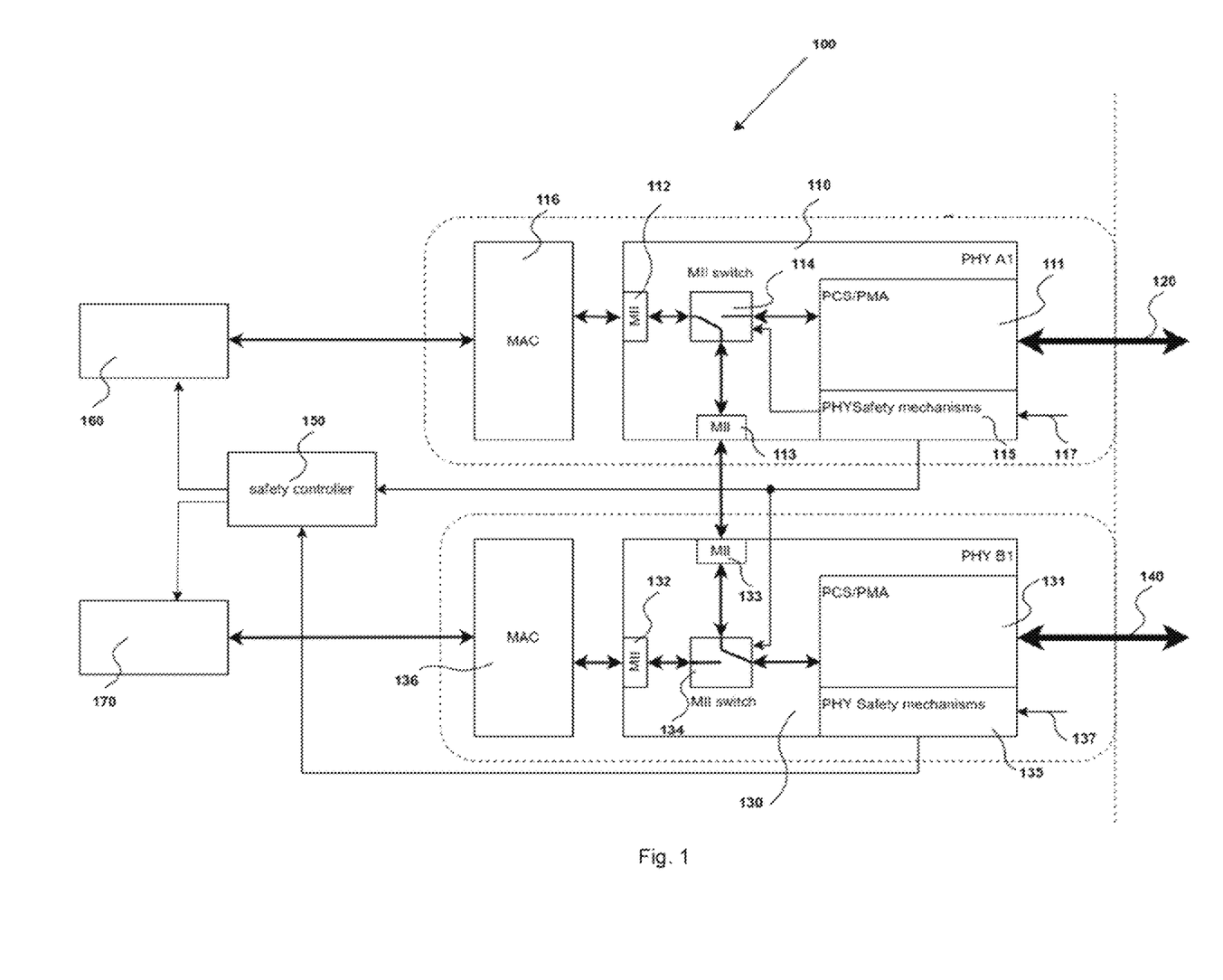
FIG. 1 a schematic diagram of an ethernet device with safety features at the physical layer according to the invention, FIG. 2 a schematic diagram of ethernet connection between two ethernet devices with safety features at the physical layer according to the invention, and FIG. 3 a schematic diagram of ethernet connection between an ethernet device with safety features at the physical layer according to the invention and an ethernet device without safety features at the physical layer.

FIG. 1 shows a schematic diagram of an ethernet device 100, 200 with safety features at the physical layer according to the invention. The ethernet device 100, 200 comprises a first ethernet physical layer access device 110, 210 and a second ethernet physical layer access device 130, 230.

The first ethernet physical access device 110, 210 comprises a first PCS/PMA unit 111, 211 for accessing a first ethernet channel 120; a first media independent interface port 112, 212 for ethernet data communication; a second media independent interface port 113, 213 for ethernet data communication; and a first media independent interface switch 114, 214, which in a first operating state connects the first media independent interface port 112, 212 to the PCS/PMA unit 111, 211 and in a second operating state connects the first media independent interface port 112, 212 to the second media interface port 113, 213.

The second ethernet physical layer access device 130, 230 comprises a second PCS/PMA unit 131, 231 for accessing a second ethernet channel 140; a third media independent interface port 132, 232 for ethernet data communication; a fourth media independent interface port 133, 233 for ethernet communication; and a second media independent interface switch 134, 234, which in a first operating state connects the second PCS/PMA unit 131, 231 to the third media independent interface port 132, 232 and in a second operating state connects the second PCS/PMA unit 131, 231 to the fourth media independent interface port 133, 233.

The second media independent interface port 113, 213 of the first ethernet physical layer access device 110, 210 is connected to the fourth media independent interface port 133, 233 of the second ethernet physical layer access device 130, 230.

The first ethernet physical layer access device 110, 210 further comprises a first physical layer safety mechanism unit 115, 215 for detecting a safety problem of the physical layer of the first ethernet channel 120, like a loss of the link, a degradation of link quality or errors in the received ethernet data packets. The first physical layer safety mechanism unit 115, 215 is connected to the first media independent interface switch 114, 214 and to the second media independent interface switch 134, 234 for switching the first media independent interface switch 114, 214 and the second media independent interface switch 134, 234 from the first operating states to the second operating states if a problem has been detected by the first physical layer safety mechanism unit 115, 215.

The second ethernet physical layer access device 130, 230 also further comprises a second physical layer safety mechanism unit 135, 235 for detecting a safety problem of the physical layer of the second ethernet channel 140, like a loss of the link, a degradation of link quality or errors in the received ethernet data packets.

The ethernet device 100, 200 with safety functions at the physical layer shown in FIG. 1 further comprises a safety controller 150, 250, wherein the first physical layer safety mechanism unit 115, 215 and the second physical layer safety mechanism unit 135, 235 send notifications to the safety controller 150, 250 if safety problems have been detected on the corresponding first ethernet channel 120 respectively second ethernet channel 140. The safety controller 150, 250 can issue warnings to the system 160, 170, 260, 270 using the ethernet device 100, 200 that the first ethernet channel 120 and/or second ethernet channel 140 has safety problems.

The first ethernet physical layer access device 110, 210 further comprises a first medium access controller 116, 216, which is connected to the first media independent interface port 112, 212 and the second medium access controller 130, 230 comprises a second medium access controller 136, 236, which is connected to the third media independent interface port 132, 232. The first medium access controller 116, 226 and second medium access controller 136, 236 are used for example by systems 160, 170 to access the physical layer for ethernet communication.

According to the embodiment shown in FIG. 1 the first physical layer safety mechanism unit 115, 215 and the second physical layer safety mechanism unit 135, 235 comprise an input interface 117, 217, 137, 237 for receiving external safety signals. The external safety signal originates for example from the hardware using the ethernet device 100, 200 with safety features at the physical layer, like systems 160, 170. The external safety signal refers e.g. to supply voltage range violations, temperature range violations, hardware or software built-in self-test results that indicate a component failure during operation, or similar safety critical issues of the external components.

The first physical layer safety mechanism unit 115, 215 and/or the second physical layer safety mechanism unit 135, 235 detects the loss of the respective link, the degradation of the respective link quality or errors in the received ethernet data packets through link status monitoring through evaluation and/or checking of link idle symbols, through:

CRC checksum calculation of the received ethernet frames in the physical layer, error correction codes like RS encoder/decoder for 1000BASE-T1, observation of link quality indicators, like SQI or MSI, and messaging of degradation of link quality, echo canceller weight observation to detect cable degradation during operation, extension of cable diagnostics during operation, and/or classification of faults.

In a preferred embodiment the first PCS/PMA unit 111, 211 for accessing the first ethernet channel 120 and/or the second PCS/PMA unit 131, 231 for accessing the second ethernet channel 140 sends a predetermined pattern on the respective ethernet channel 120, 140 if the first physical layer safety mechanism unit 115, 215 respectively the second physical layer safety mechanism unit 135, 235 detects a safety problem for the respective ethernet channel 120, 140.

In the first operating state of the first media independent interface switch 114, 214 and of the second media independent interface switch 134, 234 the first ethernet channel 120 is used for safety critical data traffic and the second ethernet channel 140 is used for non-safety critical data traffic and in the second operating state of the first media independent interface switch 114, 214 and of the second media independent interface switch 134, 234 the non-safety critical data traffic on the second ethernet channel 140 is interrupted and replaced by the safety critical data traffic of the corrupted first ethernet channel 120. Preferably, the non-safety critical data traffic over the second ethernet channel 140 is immediately interrupted in the second operating state and replaced after a certain threshold by the safety critical data traffic.

In an embodiment of the invention, the ethernet device 100, 200 retransmits data traffic that has not been completely transmitted before the first media independent interface switch 114, 214 and the second media independent interface switch 134, 234 have switched from the first operating state to the second operating state.

Figure 2:
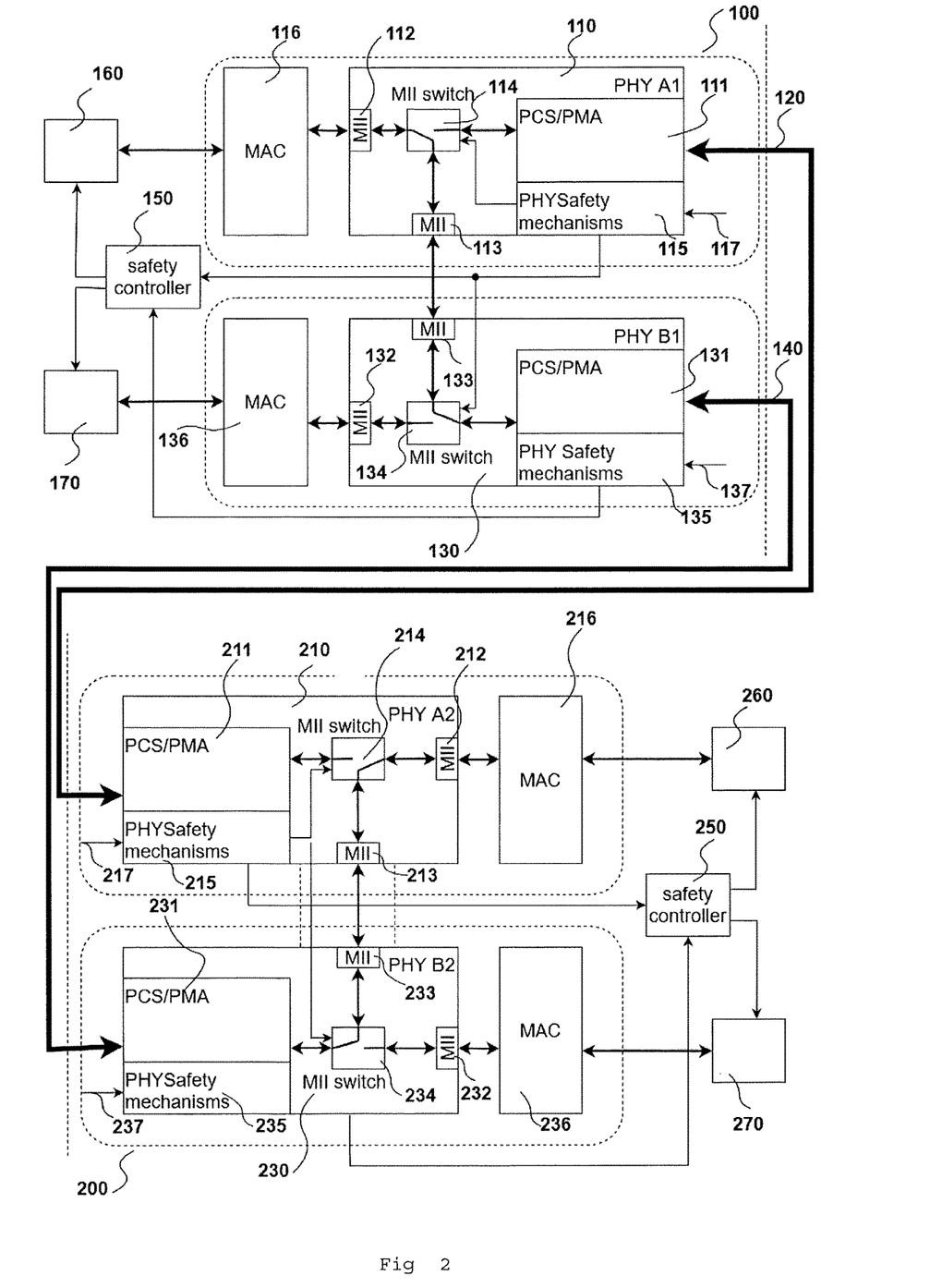

The use of the ethernet device 100, 200 with safety features at the physical layer shown in FIG. 1 is explained in more detail with respect to FIG. 2, which shows a schematic diagram of ethernet connection between two ethernet devices 100, 200 with safety features at the physical layer according to the invention. The first ethernet device 100 with safety features at the physical layer and the second ethernet device 200 with safety features at the physical layer both are identical to the ethernet device 100 shown in FIG. 1. Thus, we refer to the above description regarding the details of the first and second ethernet device 100, 200 with safety features at the physical layer. The corresponding parts of the first and second ethernet device 100, 200 have corresponding reference numerals, only differing by the first digit, which indicates the first respectively second ethernet device 100, 200.

According to FIG. 2 a first ethernet channel 120 and a second ethernet channel 200 are provided between two ethernet devices 100, 200 with safety features at the physical layer according to the present invention. The first ethernet channel 120 is accessed by the respective first ethernet physical access devices 110, 210 and the second ethernet channel 140 is accessed by the respective second ethernet physical access devices 130, 230.

The first ethernet channel 120 is used for a bi-directional safety critical data transfer and the second ethernet channel 140 is used for a bi-directional non-safety critical data transfer.

If a safety problem of the physical layer of the first ethernet channel 120 is detected by the first and/or second ethernet device 100, 200, the first and second ethernet devices 100, 200 switch from a first operating state to a second operating state. In the second operating state the bi-directional non-safety critical data transfer over the second ethernet channel 140 is interrupted and the bi-directional safety critical data traffic re re-routed over the second ethernet channel 140.

Particularly, the non-safety critical data transfer on the second ethernet channel 140 is immediately interrupted in the second operating state and replaced after a certain threshold by the safety critical data traffic.

The safety critical data is reassembled after re-routing over the second ethernet channel 140 at the physical layer of the respective ethernet device 100, 200 with safety features at the physical layer. In a variant of the invention, data traffic that has not been transmitted before the switch from the first operating state to the second operating state is retransmitted to avoid any loss of data.

If one of the ethernet devices 100, 200 detects a safety problem on the first and/or second ethernet channel 120, 140 is sends a predetermined pattern on the respective ethernet channel 120, 140. This pattern can be identified by the other ethernet device 120, 140 and thereby also detect the safety problem on that respective ethernet channel 120, 140. In many cases, one of the two ethernet devices 100, 200 detects the safety problem earlier and using the predetermined pattern the other ethernet device can be informed about the detected safety problem.

If a safety problem has been detected for the first ethernet channel 120 and/or the second ethernet channel, a corresponding notification is sent to the systems 160, 260 using the ethernet devices 100, 200 for the safety critical data transfer. A corresponding notification can also be sent to the systems 170, 270 using the ethernet devices 100, 200 for non-safety critical data transfer.

The ethernet devices 100, 200 can further receive external safety signals regarding the first ethernet channel 120 and/or second ethernet channel 140 via respective input interfaces 117, 137, 217, 237. The external safety signal originates for example from the hardware, like systems 160, 170, 260, 270, using the ethernet device 100, 200 with safety features at the physical layer. The external safety signal e.g. refers to supply voltage range violations, temperature range violations, hardware or software built-in self-test results that indicate a component failure during operation, or similar safety critical issues of the external components.

Figure 3:
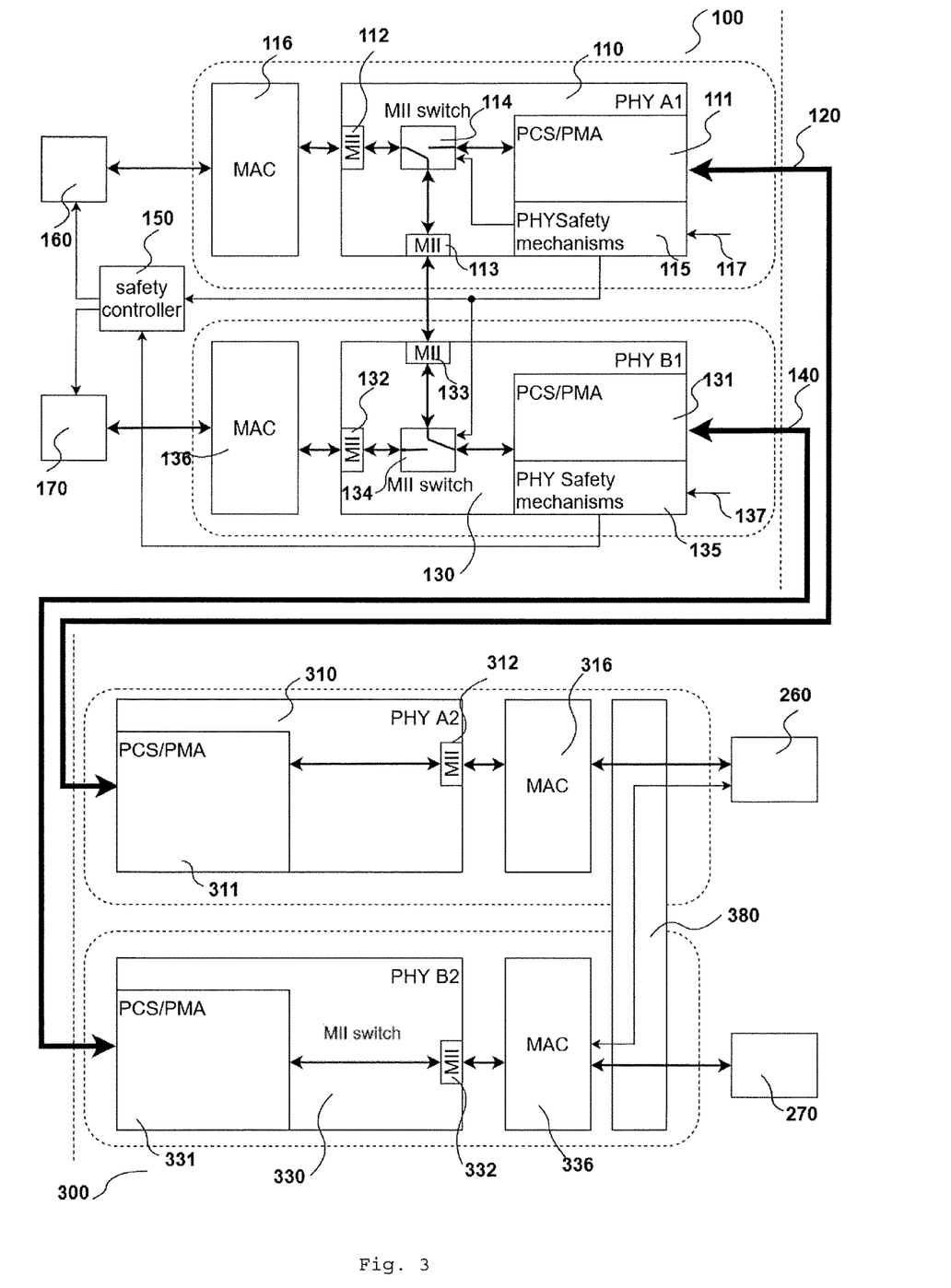

FIG. 3 shows a schematic diagram of ethernet connection between an ethernet device 100, 200 with safety features at the physical layer according to the invention and an ethernet device 300 without safety features at the physical layer.

The ethernet device 100, 200 with safety features at the physical layer corresponds to the one shown in FIG. 1. For further details we refer to the above description of FIG. 1.

The ethernet device 300 without safety features at the physical layer comprises a first ethernet physical layer access device 310 and a second ethernet physical layer access device 330. The first and second ethernet physical layer access devices 310, 330 each comprise a PCS/PMA unit 311, 331, a media independent interface port 312, 332 and a medium access controller 316, 336. The ethernet data traffic is routed over the respective PCS/PMA unit 311, 331, media independent interface port 312, 332 and medium access controller 316, 336 to the systems 260, 2270 using the ethernet device 300. Since the ethernet device 300 does not provide security features at the physical layer, the re-routing of the safety critical data traffic in the second operating state of the ethernet device 100, 200 with safety features at the physical layer is not detected by the ethernet device 300 without safety features at the physical layer. However, at an application layer level the re-routing can be detected by data inspection of the transmitted data. Thus, ethernet devices 100, 200 with safety features at the physical layer can operate together with ethernet devices 300 without safety features at the physical layer. Only at the application layer a data inspection must be implemented to benefit from the security features at the physical layer from the other ethernet device 100, 200, which however is possible without any change in the underlying hardware.

LIST OF REFERENCE NUMERALS

- 100 ethernet device with safety features at the physical layer
- 110 first ethernet physical layer access device
- 111 first PCS/PMA
- 112 first media independent interface port
- 113 second media independent interface port
- 114 first media independent interface switch
- 115 safety mechanism unit (first ethernet physical layer access device)
- 116 medium access controller (first ethernet physical layer access device)
- 117 input interface (first ethernet physical layer access device)
- 120 first ethernet channel
- 130 second ethernet physical layer access device
- 131 second PCS/PMA
- 132 third media independent interface port
- 133 fourth media independent interface port
- 134 second media independent interface switch
- 135 safety mechanism unit (second ethernet physical layer access device)
- 136 medium access controller (second ethernet physical layer access device)
- 137 input interface (second ethernet physical layer access device)
- 140 second ethernet channel
- 150 ethernet channel
- 160 system using ethernet device
- 170 system using ethernet device
- 200 ethernet device with safety features at the physical layer
- 210 first ethernet physical layer access device
- 211 first PCS/PMA
- 212 first media independent interface port
- 213 second media independent interface port
- 214 first media independent interface switch
- 215 safety mechanism unit (first ethernet physical layer access device)
- 216 medium access controller (first ethernet physical layer access device)
- 217 input interface (first ethernet physical layer access device)
- 230 second ethernet physical layer access device
- 231 second PCS/PMA
- 232 third media independent interface port
- 233 fourth media independent interface port
- 234 second media independent interface switch
- 235 safety mechanism unit (second ethernet physical layer access device)
- 236 medium access controller (second ethernet physical layer access device)
- 237 input interface (second ethernet physical layer access device)
- 250 ethernet channel
- 260 system using ethernet device
- 270 system using ethernet device
- 300 ethernet device without safety features at the physical layer
- 310 first ethernet physical layer access device
- 311 first PCS/PMA
- 312 first media independent interface port
- 316 medium access controller (first ethernet physical layer access device)
- 330 second ethernet physical layer access device
- 331 second PCS/PMA
- 332 second media independent interface port
- 336 medium access controller (second ethernet physical layer access device)
- 380 application layer

The invention claimed is:

1. An ethernet device with safety features at the physical layer, comprising:
a first ethernet physical layer access device comprising:
a first PCS/PMA unit for accessing a first ethernet channel;
a first media independent interface port for ethernet data communication;
a second media independent interface port for ethernet data communication; and
a first media independent interface switch, which in a first operating state connects the first media independent interface port to the PCS/PMA unit and in a second operating state connects the first media independent interface port to the second media independent interface port;
a second ethernet physical layer access device comprising:
a second PCS/PMA unit for accessing a second ethernet channel;
a third media independent interface port for ethernet data communication;
a fourth media independent interface port for ethernet communication; and
a second media independent interface switch, which in a first operating state connects the second PCS/PMA unit to the third media independent interface port and in a second operating state connects the second PCS/PMA unit to the fourth media independent interface port;
wherein the second media independent interface port of the first ethernet physical layer access device is connected to the fourth media independent interface port of the second ethernet physical layer access device;
wherein the first ethernet physical layer access device further comprises a first physical layer safety mechanism unit for detecting a safety problem of the physical layer of the first ethernet channel;
wherein the first physical layer safety mechanism unit is connected to the first media independent interface switch and to the second media independent interface switch for switching the first media independent interface switch and the second media independent interface switch from the first operating states to the second operating states if said safety problem has been detected by the first physical layer safety mechanism unit.

2. The ethernet device with safety features at the physical layer according to claim 1, wherein the second ethernet physical layer access device further comprises a second physical layer safety mechanism unit for detecting a safety problem of the physical layer of the second ethernet channel.

3. The ethernet device with safety features at the physical layer according to claim 1,
further comprising a safety controller, wherein the first physical layer safety mechanism unit and/or the second physical layer safety mechanism unit send notifications to the safety controller if safety problems have been detected on the corresponding first ethernet channel and/or second ethernet channel, wherein the safety controller can issue warnings to a system using the ethernet device that the first ethernet channel and/or second ethernet channel has safety problems.

4. The ethernet device with safety features at the physical layer according to claim 1,
further comprising a first medium access controller, which is connected to the first media independent interface port of the first ethernet physical layer access device, and a second medium access controller, which is connected to the third media independent interface port of the second ethernet physical layer access device.

5. The ethernet device with safety features at the physical layer according to claim 1,
wherein the first physical layer safety mechanism unit and/or the second physical layer safety mechanism unit comprises an input interface for receiving external safety signals.

6. The ethernet device with safety features at the physical layer according to claim 5,
wherein the external safety signal originates from the hardware using the ethernet device with safety features at the physical layer.

7. The ethernet device with safety features at the physical layer according to claim 5,
wherein the external safety signal refers to supply voltage range violations, temperature range violations, hardware or software built-in self-test results that indicate a component failure during operation, or similar safety critical issues of the external components.

8. The ethernet device with safety features at the physical layer according to claim 1,
wherein the first physical layer safety mechanism unit and/or the second physical layer safety mechanism unit detects the loss of the respective link, the degradation of the respective link quality or errors in the received ethernet data packets through link status monitoring through evaluation and/or checking of link idle symbols, through CRC checksum calculation of the received ethernet frames in the physical layer, through error correction codes, through observation of link quality indicators and messaging of degradation of link quality, through echo canceller weight observation to detect cable degradation during operation, through extension of cable diagnostics during operation, and/or through classification of faults.

9. The ethernet device with safety features at the physical layer according to claim 1,
wherein the first PCS/PMA unit for accessing the first ethernet channel and/or the second PCS/PMA unit for accessing the second ethernet channel sends a predetermined pattern on the respective ethernet channel if the first physical layer safety mechanism unit and/or the second physical layer safety mechanism unit detects a safety problem for the respective ethernet channel.

10. The ethernet device with safety features at the physical layer according to claim 1,
wherein in the first operating state of the first media independent interface switch and of the second media independent interface switch, the first ethernet channel is used for safety critical data traffic and the second ethernet channel is used for non-safety critical data traffic and in the second operating state of the first media independent interface switch and of the second media independent interface switch the non-safety critical data traffic on the second ethernet channel is interrupted and replaced by the safety critical data traffic of the corrupted first ethernet channel.

11. The ethernet device with safety features at the physical layer according to claim 10,
wherein in the second operating state the non-safety critical data traffic over the second ethernet channel is immediately interrupted and replaced after a certain threshold by the safety critical data traffic.

12. The ethernet device with safety features at the physical layer according to claim 10,
wherein the ethernet device retransmits data traffic that has not been completely transmitted before the first media independent interface switch and the second media independent interface switch have switched from the first operating state to the second operating state.

13. A method for a bi-directional data transfer between two ethernet devices, wherein at least one of the two ethernet devices is an ethernet device with safety features at the physical layer according to claim 1, comprising the steps of:
providing said first ethernet channel between the two ethernet devices for a bi-directional safety critical data transfer;
providing said second ethernet channel between the two ethernet devices for a bi-directional non-safety critical data transfer;
using the ethernet device with safety features at the physical layer for detecting said safety problem of the physical layer of the first ethernet channel;
if a safety problem of the first ethernet channel has been detected, the ethernet device with safety features at the physical layer switches from said first operating state to said second operating state to:
interrupt the bi-directional non-safety critical data transfer over the second ethernet channel;
re-route the bi-directional safety critical data traffic over the second ethernet channel.

14. The method for a bi-directional data transfer between two ethernet devices according to claim 13,
comprising the step of reassembling the safety critical data after re-routing over the second ethernet channel at the physical layer or application of the other ethernet device.

15. The method for a bi-directional data transfer between two ethernet devices according to claim 13,
comprising the step of sending a predetermined pattern on the respective ethernet channel for which a safety problem has been detected.

16. The method for a bi-directional data transfer between two ethernet devices according to claim 13,
comprising the step of sending a notification to the system using the ethernet device if a safety problem on one of the two ethernet channels has been detected, including if a safety problem has been detected on both ethernet channels.

17. The method for a bi-directional data transfer between two ethernet devices according to claim 13,
   comprising the step of receiving an external safety signal regarding the first ethernet channel and/or the second ethernet channel.

18. The method for a bi-directional data transfer between two ethernet devices according to claim 17,
   wherein the external safety signal originates from the hardware using the ethernet device with safety features at the physical layer.

19. The method for a bi-directional data transfer between two ethernet devices according to claim 17,
   wherein the external safety signal refers to supply voltage range violations, temperature range violations, hardware or software built-in self-test results that indicate a component failure during operation, or safety critical issues of the external components.

20. The method for a bi-directional data transfer between two ethernet devices according to claim 13,
   wherein in the second operating state the second ethernet channel is immediately interrupted and replaced after a certain threshold by the safety critical data traffic.

21. The method for a bi-directional data transfer between two ethernet devices according to claim 13,
   comprising the step of retransmitting data traffic that has not been transmitted before the switch from the first operating state to the second operating state.

\* \* \* \* \*